United States Patent [19]
Bessler

[11] Patent Number: 5,426,952
[45] Date of Patent: Jun. 27, 1995

[54] REFRIGERANT FLOW RATE CONTROL BASED ON EVAPORATOR EXIT DRYNESS

[75] Inventor: Warren F. Bessler, Schenectady, N.Y.

[73] Assignee: General Electric Company, Schenectady, N.Y.

[21] Appl. No.: 205,858

[22] Filed: Mar. 3, 1994

[51] Int. Cl.$^6$ ............................................. F25B 41/04
[52] U.S. Cl. .................................. 62/211; 62/223; 62/225
[58] Field of Search .............. 62/210, 211, 222, 223, 62/224, 225, 113, 513

[56] References Cited

U.S. PATENT DOCUMENTS

| | | | |
|---|---|---|---|
| 2,060,589 | 11/1936 | Otto | 62/211 X |
| 2,228,834 | 1/1941 | Kramer, Jr. | 62/513 X |
| 2,739,451 | 4/1956 | Breck | 62/225 X |
| 2,770,104 | 11/1956 | Sweynor | 62/513 X |
| 2,826,044 | 3/1958 | Reer | 62/113 X |
| 3,698,204 | 10/1972 | Schlotterbeck et al. | 62/206 |
| 4,112,703 | 9/1978 | Kountz | 62/211 |
| 4,167,858 | 9/1979 | Kojima et al. | 62/126 |
| 4,651,535 | 3/1987 | Alsenz | 62/225 |
| 4,653,288 | 3/1987 | Sayo et al. | 62/210 |
| 4,677,830 | 7/1987 | Sumikawa et al. | 62/126 |
| 4,685,309 | 8/1987 | Behr | 62/223 X |
| 4,745,767 | 5/1988 | Ohya et al. | 62/211 |
| 4,807,445 | 2/1989 | Matsuoka et al. | 62/225 X |
| 4,910,972 | 3/1990 | Jaster | 62/335 |
| 4,934,155 | 6/1990 | Lowes | 62/223 X |
| 5,247,989 | 9/1993 | Benevelli | 165/30 |
| 5,255,529 | 10/1993 | Powell et al. | 62/180 |
| 5,255,530 | 10/1993 | Janke | 62/180 |

OTHER PUBLICATIONS

Buxton, Joseph, "Solid State Circuits Simplify Temperature Sensing & Control," Electronic Component News, vol. 37, No. 10, ECN Sensors Supplement, Oct. 1993.

Primary Examiner—Harry B. Tanner
Attorney, Agent, or Firm—Patrick R. Scanlon; Paul R. Webb, II

[57] ABSTRACT

Pulse width modulation is used to control the flow rate through a solenoid expansion valve in a refrigeration system. A first temperature sensor is disposed on the suction line, and a second temperature sensor is disposed in a compartment to be cooled. A controller is included for controlling the duty cycle of the pulse width modulated solenoid valve. The controller receives inputs from the two temperature sensors as a basis for controlling the duty cycle. The first temperature sensor can be located either inside or outside of the compartment. Preferred exterior locations include: immediately outside of the compartment, at the inlet of the compressor, at the inlet of the heat exchanger between the suction line and the liquid line, and at the outlet of the heat exchanger.

10 Claims, 2 Drawing Sheets

REFRIGERANT FLOW RATE CONTROL BASED ON EVAPORATOR EXIT DRYNESS

CROSS REFERENCE TO RELATED APPLICATIONS

This application is related to copending application entitled "Refrigerant Flow Rate Control Based on Evaporator Exit Superheat," Ser. No. 08/205,856, and "Refrigerant Flow Rate Control Based on Suction Line Temperature," Ser. No. 08/205,857, both filed concurrently herewith and assigned to the same assignee as the present invention.

BACKGROUND OF THE INVENTION

This invention relates generally to refrigerant expansion control in refrigeration systems and more particularly concerns using pulse width modulated solenoid valves for expansion control. As used herein, the term "refrigeration system" refers to refrigerators, air conditioners or any other system which produces a refrigeration effect.

Conventional refrigeration systems used in household refrigerators typically operate on the simple vapor compression cycle. Such a cycle includes a compressor, a condenser, an expansion device, and an evaporator all connected in series in the order given and charged with a refrigerant. The refrigerant is compressed by the compressor to high temperature and pressure and then condensed by the condenser where it loses heat to the ambient. The liquid refrigerant next flows through an expansion device, such as an expansion valve or a capillary tube, so that it undergoes adiabatic expansion. The now low pressure refrigerant flows through the evaporator and is vaporized by absorbing heat from air passing over the evaporator. The cooled air is used to refrigerate one or more refrigerator compartments. The gaseous or mostly gaseous refrigerant exiting the evaporator is returned to the compressor via a suction line to repeat the cycle.

Household refrigerators typically use a capillary tube to control refrigerant expansion because it is a simple, low cost device. However, capillary tubes have a number of limitations as expansion devices. For instance, capillary tubes must be made very long to allow an inside diameter which is manufacturable and large enough to avoid clogging. This needed length takes up space in the refrigerator. The use of capillary tube expansion control also requires very precise refrigerant charging operations during production because the flow rate through the capillary tube is highly sensitive to the amount of refrigerant charge in the system.

Furthermore, a capillary tube can be sized to provide the optimum refrigerant flow rate for only one operating condition. Capillary tubes are thus typically sized to provide the optimum flow rate for normal operating conditions. This means that when the refrigeration cycle begins (as well as under high load conditions), the capillary tube is undersized, and the evaporator is starved of refrigerant. This reduces the cooling capacity and efficiency of the refrigerator. Near the end of the refrigeration cycle, the capillary tube will be oversized and the evaporator will be flooded, again reducing efficiency. Because of this, cycle efficiency using capillary tube expansion is considerably below that attainable with active expansion control.

However, active expansion control, in the form of conventional thermostatic expansion valves, does not work well in household refrigerators. While thermostatic expansion valves are often used in automotive air conditioning and commercial refrigeration systems which have large refrigerant flow rates, they cannot be made with orifices small enough to regulate the very low flow rates (typically 10–12 lb/hr) of household refrigerators. That is, to achieve the required pressure drop the valve orifice would need to be on the order of 10 mils or less, a size that is impractical to manufacture and very susceptible to plugging.

Accordingly, there is a need for an alternative to capillary tubes and thermostatic expansion valves as expansion control in household refrigerators.

SUMMARY OF THE INVENTION

The above-mentioned needs are met by the present invention which uses a pulse width modulated solenoid valve for expansion control. A pulse width modulated control signal is generated for cyclically opening and closing the valve. The pulse width of the control signal determines the average flow rate through the valve. The duty cycle of the valve is varied in accordance with evaporator exit dryness to precisely control the average flow rate.

Specifically, the present invention provides a refrigeration system comprising an evaporator disposed in the compartment to be cooled and a compressor connected to the outlet of the evaporator by a suction line. A pulse width modulated solenoid valve is connected to the inlet of the evaporator by an inlet line. A condenser is connected to the pulse width modulated solenoid valve by a liquid line. The liquid line and the suction line are placed in thermal contact to form a heat exchanger therebetween. A first temperature sensor is disposed on the suction line, and a second temperature sensor 18 disposed in the compartment. A controller is included for controlling the duty cycle of the pulse width modulated solenoid valve. The controller receives inputs from the two temperature sensors as a basis for controlling the duty cycle. The first temperature sensor can be located either inside or outside of the compartment. Preferred exterior locations include: immediately outside of the compartment, at the inlet of the compressor, at the inlet of the heat exchanger, and at the outlet of the heat exchanger.

Several advantages are realized by using a pulse width modulated solenoid valve for expansion control. Because of its oscillating manner of operating, the pulse width modulated solenoid valve can be made with a larger orifice, thereby avoiding plugging problems. Systems using pulse width modulated control are relatively insensitive to total refrigerant charge which eases charging requirements during production. Pulse width modulated solenoid valves are beneficial for use with variable and/or multi-speed compressors because of the ability to match different flow rates as the compressor displacement changes. During the off cycle, a pulse width modulation solenoid valve can be used to maintain a positive seal between the high and low pressures, thereby preventing refrigerant migration and conserving energy. The solenoid valve therefore acts as an energy valve, eliminating the need for a separate valve to serve this function.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
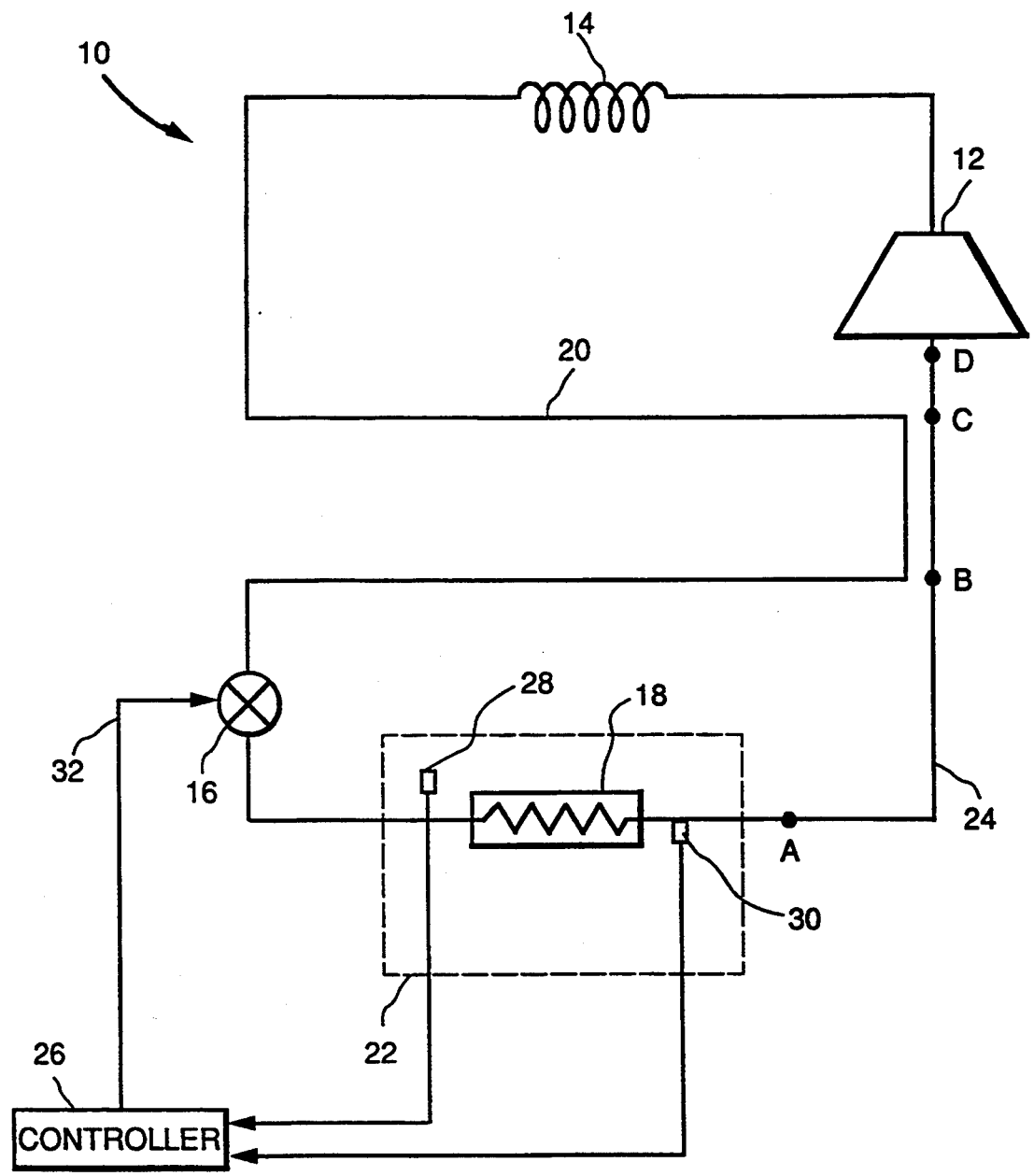
FIG. 1 is a schematic representation of one embodiment of a refrigeration cycle in accordance with the present invention.

Referring to the drawings wherein identical reference numerals denote the same elements throughout the various views, FIG. 1 shows a refrigeration system 10 comprising a compressor 12, a condenser 14, an expansion valve 16, and an evaporator coil 18, all connected in a closed series loop in the order given. The refrigeration system 10 is charged with a refrigerant which is first compressed in the compressor 12. The compressed refrigerant is then discharged to the condenser 14, where it is cooled and condensed to a liquid and expelled into a liquid line 20. The liquid refrigerant then flows through the expansion valve 16, expanding while it does so. The refrigerant exits from the expansion valve 16 into the evaporator 18 which is preferably disposed within a compartment 22.

As the refrigerant flows through the evaporator 18, it is in a heat exchange relationship with the air in the compartment 22. Thus, heat is transferred from the compartment 22 to the refrigerant flowing through the evaporator 18, causing the liquid refrigerant to evaporate. The refrigerant preferably assumes a superheated gaseous state by the time it exits the evaporator 18. The gaseous refrigerant is then passed through a suction line 24 and returned to the compressor 12, where the cycle is repeated. As shown schematically in FIG. 1, the liquid line 20 and the suction line 24 (or at least portions thereof) are placed in thermal contact with one another in a countercurrent heat exchange relationship (e.g., soldered together) so as to improve cycle efficiency.

Although the refrigeration system 10 is described herein as operating on the simple vapor compression cycle, the present invention is equally applicable to other refrigeration cycles. For instance, the present invention could be used in a refrigeration system operating on the dual evaporator cycle described in U.S. Pat. No. 4,910,972, issued Mar. 27, 1990 to Heinz Jaster and herein incorporated by reference.

The expansion valve 16 is the throttling or metering device which controls the operation of the refrigeration system 10. In accordance with the present invention, the expansion value 16 is a pulse width modulated solenoid valve which is controlled by a controller 26 as part of a feedback loop. The controller 26 controls the expansion valve 16 on the basis of the evaporator exit dryness. The level of dryness (i.e., the amount of liquid refrigerant) indicates whether the evaporator 18 requires more refrigerant. In vapor compression cycle refrigeration systems, the difference between the evaporator outlet temperature and the air temperature in the refrigerated compartment 22 provides an indication of the evaporator exit dryness. When these two temperatures are close, the evaporator exit is dry and the valve 16 should be opened wider to increase the refrigerant flow rate.

In the present invention, the compartment air temperature is measured by an air temperature sensor 28 located in the compartment 22. Such a sensor may already be provided in the refrigerator to control operation of the compressor 12. The evaporator outlet temperature is measured by an outlet temperature sensor 30 located at a point on the suction line 24. The temperature sensors 28, 30 are preferably solid state sensors but any suitable sensors, such as resistance temperature detectors (RTDs), thermocouples or thermistors, can be used.

The controller 26 receives signals corresponding to the compartment air and evaporator outlet temperatures from the air temperature sensor 28 and the outlet temperature sensor 30, respectively. Based on these temperature signals, the controller 26 produces a control signal 32 which is fed to the solenoid valve 16. The control signal 32 is a pulse width modulated frequency signal which causes the solenoid valve 16 to oscillate between a fully open condition and a fully closed condition such that the duty cycle of the open-to-closed conditions determines the average flow rate through the expansion valve 16. The pulse width is adjusted in accordance with the detected evaporator exit dryness to maintain dryness at a relatively fixed level. By controlling the duty cycle of the valve 16 to maintain a desired evaporator exit dryness, optimal system performance can be obtained.

Figure 2:
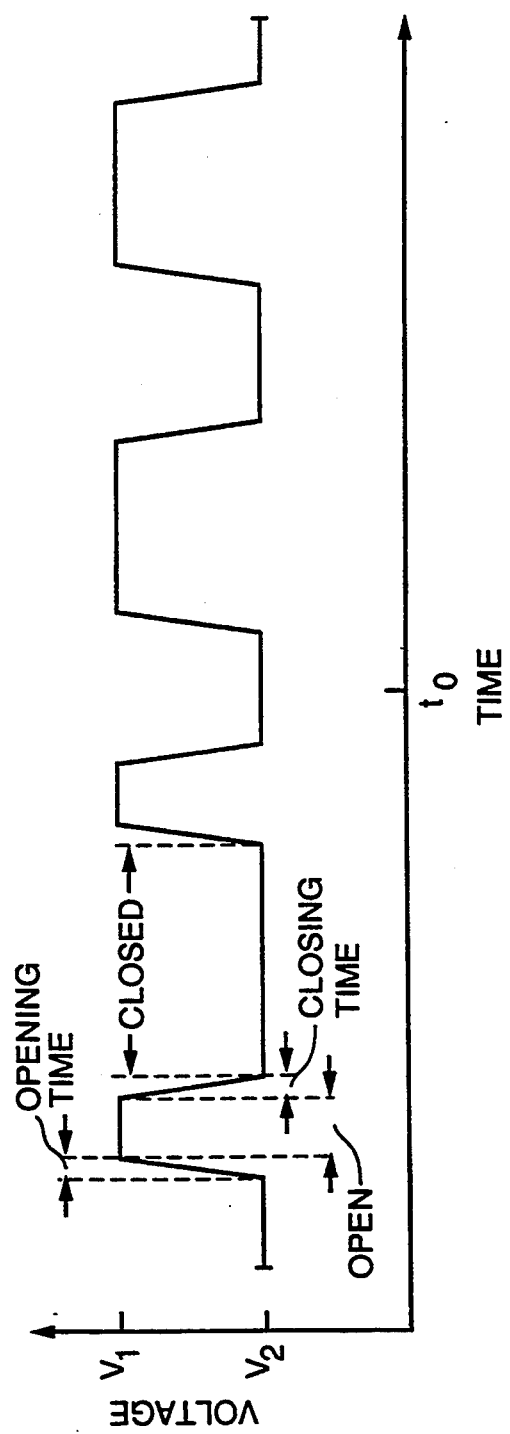
FIG. 2 is an illustration of a pulse width modulated frequency signal used in accordance with the present invention to control an expansion valve.

FIG. 2 shows a sample waveform for the control signal 32. The waveform is a digital square wave which alternates between a maximum control voltage $V_1$ and a minimum control voltage $V_2$. When the waveform is in the maximum control voltage $V_1$, the valve 16 is moved to the fully open condition, and when the waveform is in the minimum control voltage $V_2$, the valve 16 is moved to the fully closed condition. Instead of an instantaneous voltage change, the pulse width modulated waveform shown in FIG. 2 has a brief transition period between the maximum and minimum voltages. This avoids the problem of a pressure shockwave being generated in the refrigerant which can occur when an expansion valve is abruptly opened and closed. The frequency of the waveform is constant regardless of system flow rate demand conditions. Preferably, this frequency is set in the range of about 0.1-2 hertz.

The average flow rate through the expansion valve 16 is dependent on the duty cycle of the pulse width modulated waveform. Thus, prior to the time $t_0$ shown in FIG. 2, the time the valve 16 is fully open is less than the time the valve 16 is fully closed, thereby producing a relatively low average flow rate. After time $t_0$ (at which time increased dryness is detected indicating a higher demand for refrigerant), the controller 26 adjusts the duty cycle so that the time the valve 16 is fully open is increased with respect to the time the valve 16 is fully closed, thereby producing a larger average flow rate.

Preferably, the expansion valve 16 is a normally closed valve; that is, the valve 16 closes when the solenoid coil is not energized. This means that the minimum control voltage $V_2$ can be zero for valve closure. Furthermore, power to the valve 16 is interrupted whenever the compressor 12 is shut down. The valve 16 thus remains closed during periods of compressor shutdown. This prevents refrigerant migration to the evaporator 18 during the off cycle, thereby conserving energy. The solenoid valve 16 therefore acts as an energy valve, eliminating the need for a separate valve to serve this function.

The controller 26 can comprise one of a variety of pulse width modulation control schemes known in the art. Suitable pulse width modulation controllers are described in U.S. Pat. No. 4,651,535 issued Mar. 24, 1987 to Richard H. Alsenz and in U.S. Pat. No. 5,255,530 issued Oct. 26, 1993 to Donald E. Janke, both of which are herein incorporated by reference.

There are a number of possible positions where the outlet temperature sensor 30 could be located. These include inside of the compartment 22 (as shown FIG. 1), immediately outside the compartment 22 (point A of FIG. 1), at the inlet of the suction line heat exchanger with the liquid line 20 (point B of FIG. 1), at the outlet of the suction line heat exchanger (point C of FIG. 1), and at the inlet of the compressor 12 (point D of FIG. 1). The location of the outlet temperature sensor 30 will determine the point of transition from wet to dry and is selected for maximum performance. Generally, positioning the outlet temperature sensor 30 nearer to the evaporator 18 will increase cycle efficiency, while positioning the outlet temperature sensor 30 nearer to the compressor 12 will increase cooling capacity.

The foregoing has described an improved refrigeration system which uses a pulse width modulated solenoid valve for expansion control. The valve is controlled on the basis of evaporator exit dryness. While specific embodiments of the present invention have been described, it will be apparent to those skilled in the art that various modifications thereto can be made without departing from the spirit and scope of the invention as defined in the appended claims.

What is claimed is:

1. A refrigerator system for cooling at least one compartment, said refrigeration system comprising:
   an evaporator having an inlet and an outlet;
   a compressor connected to said outlet of said evaporator by a suction line;
   a pulse width modulated solenoid valve connected to said inlet of said evaporator;
   a first temperature sensor disposed on said suction line;
   a second temperature sensor disposed in said compartment; and
   a controller for controlling the duty cycle of said pulse width modulated solenoid valve in response to the difference between the temperature of said evaporator outlet and the temperature in said compartment.

2. The refrigerator system of claim 1 wherein said first temperature sensor is located in said compartment.

3. The refrigerator system of claim 1 wherein said first temperature sensor is located immediately outside of said compartment.

4. The refrigerator system of claim 1 wherein said first temperature sensor is located at the inlet of said compressor.

5. The refrigerator system of claim 1 further comprising a condenser and a liquid line connecting said condenser and said pulse width modulated solenoid valve, said liquid line and said suction line being in thermal contact to form a heat exchanger therebetween.

6. The refrigerator system of claim 5 wherein said first temperature sensor is located at the inlet of said heat exchanger.

7. The refrigerator system of claim 5 wherein said first temperature sensor is located at the outlet of said heat exchanger.

8. The refrigerator system of claim 1 wherein said evaporator is disposed in said compartment.

9. A method of controlling refrigerant flow rate in a refrigeration system having an evaporator and a pulse width modulated solenoid valve and use for cooling at least one compartment, said method comprising the steps of:
   sensing evaporator exit temperature;
   sensing the temperature inside said compartment; and
   adjusting the duty cycle of said pulse width modulated solenoid valve based on the difference between the evaporator exit temperature and the temperature inside said compartment.

10. A refrigerator system for cooling at least one compartment, said refrigeration system comprising:
    an evaporator having an inlet and an outlet;
    a pulse width modulated solenoid valve connected to said inlet of said evaporator; and
    a controller for controlling the duty cycle of said pulse width modulated solenoid valve in response to the difference between the temperature of said evaporator outlet and the temperature in said compartment.

* * * * *